(12) United States Patent
Sullivan (10) Patent No.: US 10,131,020 B2
(45) Date of Patent: Nov. 20, 2018

(54) PART ORIENTER WITH REMOVABLE ROTATING FIXTURE

(71) Applicant: James P. Sullivan, Framingham, MA (US)

(72) Inventor: James P. Sullivan, Framingham, MA (US)

(*) Notice: Subject to any disclaimer, the term of this patent is extended or adjusted under 35 U.S.C. 154(b) by 443 days.

(21) Appl. No.: 15/065,899

(22) Filed: Mar. 10, 2016

(65) Prior Publication Data

US 2016/0263711 A1  Sep. 15, 2016

Related U.S. Application Data

(60) Provisional application No. 62/130,709, filed on Mar. 10, 2015.

(51) Int. Cl.
B23K 37/047 (2006.01)
B23K 26/02 (2014.01)
B23K 37/053 (2006.01)
B23K 26/08 (2014.01)

(52) U.S. Cl.
CPC ........ *B23K 37/047* (2013.01); *B23K 26/0823* (2013.01); *B23K 37/0538* (2013.01)

(58) Field of Classification Search
CPC .............................. B23K 37/047; B23K 26/02
USPC .............. 219/121.6, 121.82, 121.63–121.72
See application file for complete search history.

(56) References Cited

U.S. PATENT DOCUMENTS

| 2011/0176758 | A1* | 7/2011 | Bito ...................... F16C 17/107 |
| | | | 384/121 |
| 2013/0089396 | A1* | 4/2013 | Bufano ............. H01L 21/67017 |
| | | | 414/222.01 |
| 2015/0013910 | A1* | 1/2015 | Krupyshev .............. B25J 9/042 |
| | | | 156/345.32 |
| 2016/0346862 | A1* | 12/2016 | Bornemann ............. B23K 9/32 |

* cited by examiner

*Primary Examiner* — Samuel M Heinrich
(74) *Attorney, Agent, or Firm* — Joseph B. Milstein PC (57) ABSTRACT

A machine for manufacturing parts that includes a base having therein one or more motors, an electrical power input port and a connector for connection to a general purpose programmable controller, and including a removable part holding and aligning (or presenting) fixture which can hold and rotate one or more parts to a specific location. The machine can include a tool for performing a process on a part. The machine can include a programmed general purpose controller that can control the operation of the machine during a manufacturing process.

22 Claims, 10 Drawing Sheets

PART ORIENTER WITH REMOVABLE ROTATING FIXTURE

CROSS-REFERENCE TO RELATED APPLICATIONS

This application claims priority to and the benefit of co-pending U.S. provisional patent application Ser. No. 62/130,709, filed Mar. 10, 2015, which application is incorporated herein by reference in its entirety.

FIELD OF THE INVENTION

The invention relates to manufacturing in general and particularly to part manufacture and inspection.

BACKGROUND OF THE INVENTION

Description of the Related Art

There are many known devices for presentation of parts that need to be oriented and rotated in manufacturing and inspection. Most of these devices consist of a motor with a part holding fixture attached to it. The part to be processed is placed in the part holding fixture and then manipulated to the appropriate angle. These are typically referred to as Rotary or 4th Axis systems.

In recent years more manufacturing operations are utilizing methods which are low force or non-contact. Examples of this include laser marking, laser welding, engraving, and machine vision inspection. As these methods have become more common, the standard method of part presentation has remained the same. A workpiece holder is attached to a rotary drive, and the relative orientation of the part being processed is determined by the relationship between the fixture and the rotary drive. In a manufacturing process, changes from one part being manufactured to a different part being manufactured typically requires physically attaching a new workpiece holder to the rotary drive system and then establishing the rotational orientation prior to the processing of the part.

There is a need for improved apparatus and methods for manipulating parts in manufacturing.

SUMMARY OF THE INVENTION

The present invention is an apparatus and methods for manipulating parts in manufacturing that facilitates rapid replacement of the part(s) just processed with the next parts(s) to be processed.

According to one aspect, the invention features a machine for orienting parts, comprising: a fixture base having one or more motors, an electrical power input port and a connector for connection to a general purpose programmable controller; a removable part holding and aligning fixture configured to be mated to the fixture base in a predetermined location and orientation relative to each other, the removable part holding and aligning fixture having at least one workpiece holder configured to hold a part and to align the part so that a processing step can be applied to a specific location on the part; the base and the removable part holding and aligning fixture each comprising one half of a non-contact coupling, the non-contact coupling configured to provide a connection sufficiently rotationally rigid that the necessary power or torque needed to rotate one or more parts can be transmitted from one of the one or more motors to at least one workpiece holder, and with adequate clearance as to allow for the removal of the part holding and aligning fixture without mechanical interference.

In one embodiment, the removable part holding and aligning fixture comprises one or more handles configured to assist in mating the removable part holding and aligning fixture with the fixture base or removing it therefrom.

In another embodiment, the fixture base comprises at least one aligning pin and the removable part holding and aligning fixture comprises at least one mating orifice defined therein.

In another embodiment, the removable part holding and aligning fixture comprises at least one aligning pin and the fixture base comprises at least one mating orifice defined therein.

In yet another embodiment, one of the one or more motors is a rotational drive.

In still another embodiment, one of the one or more motors is a translational drive.

In a further embodiment, the removable part holding and aligning fixture comprises a plurality of workpiece holders commonly driven by a synchronous drive.

In yet a further embodiment, the fixture base further comprises an orientation sensor and the removable part holding and aligning fixture further comprises an orientation target.

In an additional embodiment, the machine for processing parts further comprises a general purpose programmable controller operating under a set of instructions recorded on a machine readable medium, the general purpose programmable controller configured by the instructions to sense an orientation based on data received from the orientation target.

In one more embodiment, the machine for manufacturing parts further comprises a tool configured to perform a process on a part held in one of the at least one workpiece holder.

In still a further embodiment, the tool is a laser.

In still a further embodiment, the tool is an optical inspection device.

In still a further embodiment, the tool is an engraver.

In still a further embodiment, the tool is a measurement device.

This invention relates to the field of part manufacture and inspection. More specifically, the invention comprises a machine for processing parts that includes a base having therein one or more motors, an electrical power input port and a connector for connection to a general purpose programmable controller, and including a removable part holding and aligning (or presenting) fixture which can hold and rotate one or more parts to a specific location. More specifically, the invention comprises a non-contact rotation drive and sensor system which optionally replaces a conventional CNC $4^{th}$ axis.

Computer Numerical Control (CNC) is a system used in manufacturing in which the functions and motions of a machine tool are controlled by means of a prepared program containing coded alphanumeric data. As will be further explained, the processes that are performed rely on a general purpose programmable controller operating under the control of a set of instructions recorded on a machine readable memory.

In CNC manufacturing, the first three axes are typically understood to represent three orthogonal axes, such as the X, Y and Z axes in a Cartesian coordinate system, which define locations in three dimensional space. Rotation axes, such as the CNC 4$^{th}$ axis, are defined in addition to the three axes that are used to locate a point in space.

The present invention seeks to provide a means for removing and installing a part fixture which maintains the orientation and rotational capability but does not require a mechanical rotary connection or an electrical connection.

The invention relates to the holding of a part or object which requires rotation and/or orientation using a fixture that can be removed, replaced, or changed. The fixture does not require a physical connection for either the rotational drive or part orientation. This is useful for such activities as inspection, laser marking, welding, engraving, and assembly. Other uses will become apparent as the invention is further understood.

The invention provides a system in which one can remove a rotational fixture from a processing system and can install a different one which can be made ready for operation without physically attaching the rotary drive-train.

In a preferred embodiment, the invention employs a non-contact magnetic rotational coupling. In other contemplated embodiments, any non-contact coupling can be used.

In a preferred embodiment, an optical sensor is used to find the reference angle of a fixture when it is installed.

This invention provides the ability to develop multiple lower cost fixtures which can be easily installed into a processing system without requiring the rotational drive system to be replicated.

Additionally, the invention supports rotating multiple parts.

BRIEF DESCRIPTION OF THE DRAWINGS

The objects and features of the invention can be better understood with reference to the drawings described below. The drawings are not necessarily to scale, emphasis instead generally being placed upon illustrating the principles of the invention. In the drawings, like numerals are used to indicate like parts throughout the various views.

LIST OF PARTS IN DRAWINGS

1. Support Rails 1
2. X-Axis Actuator 2
3. Fixture Base 3
4. Fixture 4
5. Locating Pins 5
6. Y-Axis Actuator 6
7. Orientation Sensor 7
8. Orientation Target 8
9. Rotational Drive 9
10. Rotational Drive Support 10
11. Non-Contact Coupling Half A 11
12. Non-Contact Coupling Half B 12
13. Handles 13
14. Drive Train 14
15. Rotational Shafts 15
16. Workpiece Holders (16a-16d) (generically 16)
17. Rail Endstop 17
18. Guide Rail 18
19. Tailstock Part Receiver 19
20. Live Center 20
21. Tailstock Assembly 21
22. Calibration Target 22
23. Timing Belt 23
24. Pulleys 24
25. Idlers 25
26. Tensioner 26
27. Non-Rotating fixture base 27
28. Fixture Endplates 28
29. Part Support 29
30. Part Support 30
31. Part Support 31
32. Part Support 32
33. Nuts 33
34. Parts 34a0 34b (generically 34)
35. Mating Orifice 35
100. Enclosure 100
101. Controller 101
102. Apparatus 102
103. Tool Position Adjuster 103
104. Processing Tool 104
105. Tool Controller 105
106. Operator Station 106
107. Status Indicator 107

DETAILED DESCRIPTION OF THE INVENTION

The part orienter as described herein can be constructed with various dimensions. In one embodiment, the dimensions are 200 mm wide by 600 mm long by approximately 80 mm high. For other designs, the width, the length and the depth can be adjusted as needed. Unless otherwise explicitly recited, the mechanical portions of the apparatus can be constructed from any convenient material that is sufficiently strong to support the parts to be manipulated. Typical materials of construction can include metals such as steel, non-magnetic metals, stainless steel, aluminum, brass, and the like, and engineering plastics.

Figure 1:
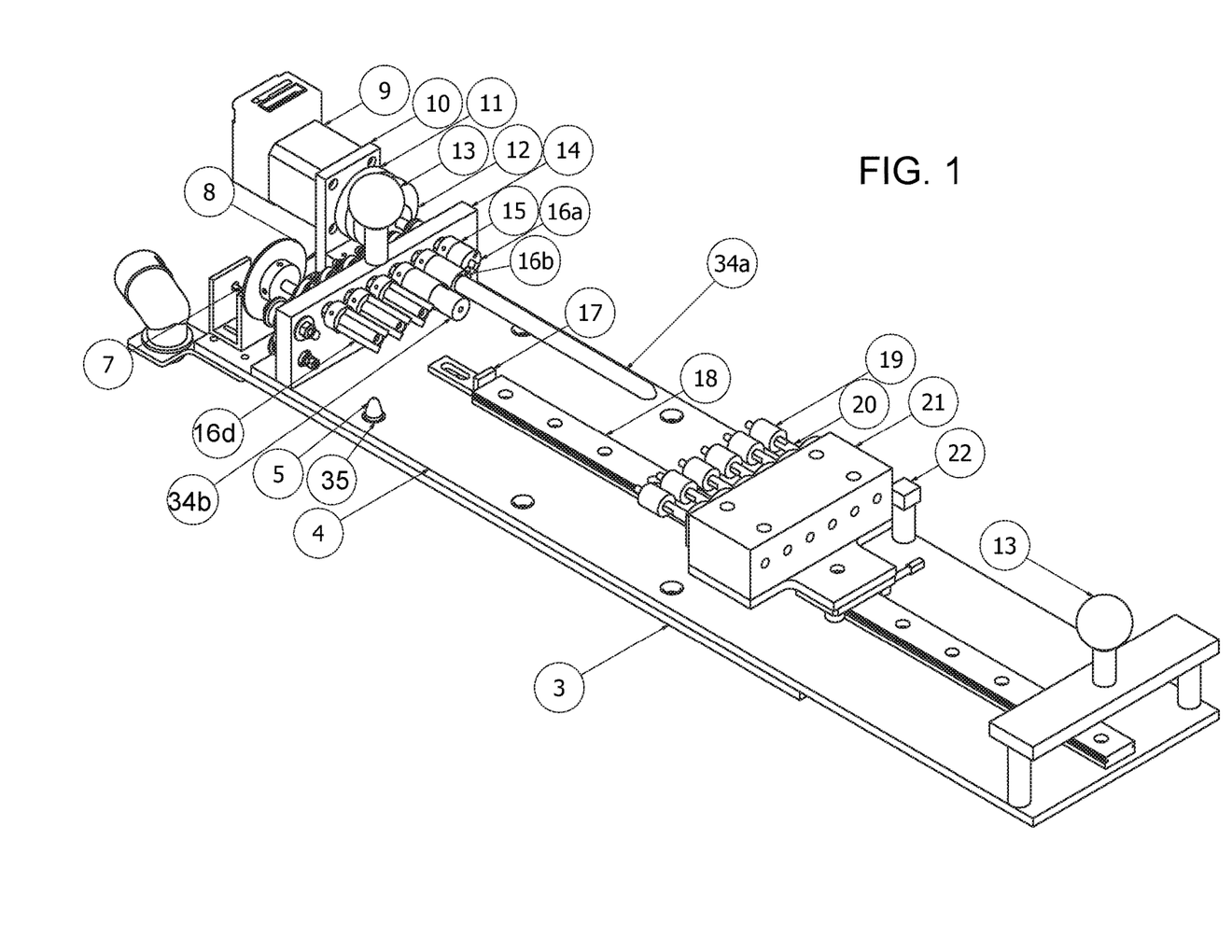
FIG. 1 is a perspective view that illustrates an embodiment of a part orienter according to principles of the invention.

FIG. 1 shows a perspective view of the complete Apparatus 102. In this embodiment the Fixture 4 is removed from the Fixture Base 3 using the Handles 13.

Figure 2:
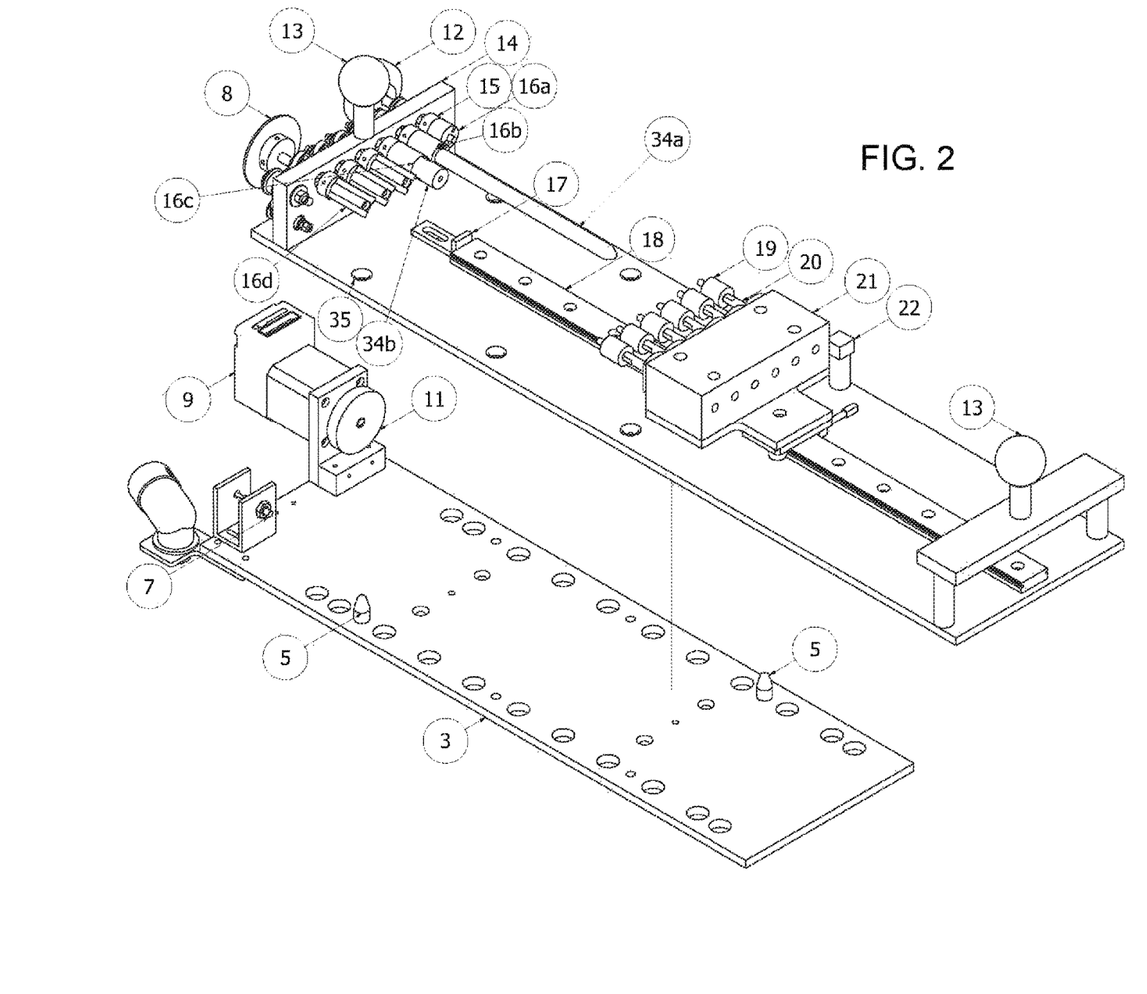
FIG. 2 is a perspective view in exploded form that illustrates two major assemblies and their mechanical interrelationship according to principles of the invention.

FIG. 2 shows the Fixture 4 separated from the Fixture Base 3. In a preferred embodiment, the Fixture 4 is located relative to Fixture Base 3 using Locating Pins 5. In one embodiment, the fixture base comprises at least one aligning pin and the removable part holding and aligning fixture comprises at least one Mating Orifice 35 defined therein. By way of example, if the aligning pin and the mating orifice are rectangular (or otherwise asymmetric), rather than circular as illustrated, only one pin and one orifice will suffice to cause the fixture base and the removable part holding and aligning fixture to be positioned and oriented in a predetermined location and orientation relative to each other when the pin and the orifice are engaged.

In other embodiments, any convenient mechanical location element that causes the base and the fixture to be positioned in a predetermined location and orientation relative to each other is acceptable.

In an additional embodiment, a machine vision system may be used to determine the location and orientation relative to each other.

The Fixture Base 3 supports the Rotational Drive 9 which includes Non-Contact Coupling Half A 11 and the orientation sensor Orientation Sensor 7. In addition, the base supports the locating pins Locating Pins 5 or other mechanical means to locate the Fixture 4.

Figure 3:
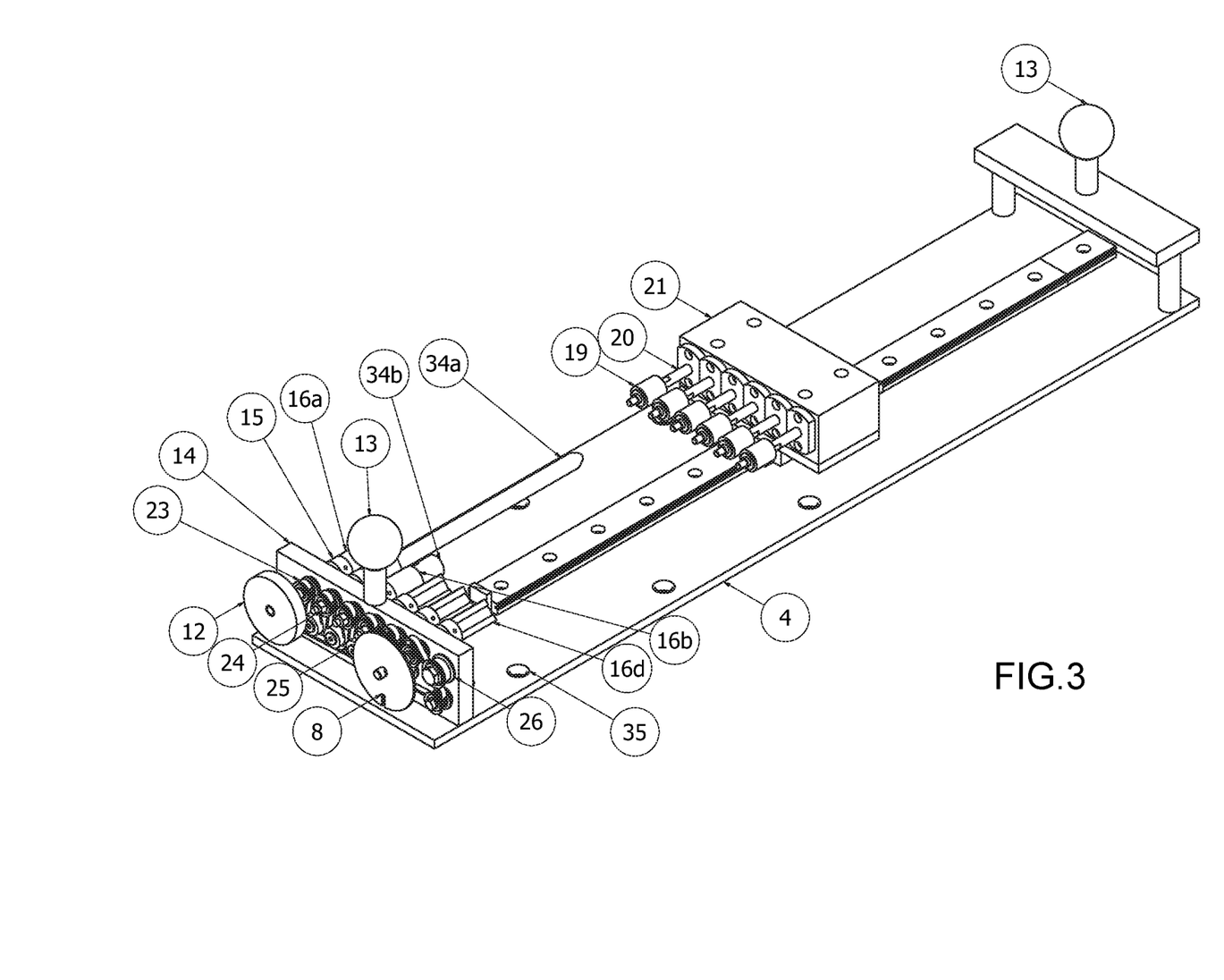
FIG. 3 is a perspective view of a Fixture Assembly that illustrates details of the apparatus according to principles of the invention.

The Fixture 4 has at least one rotating support that supports and rotates the part to be processed. The Fixture 4 includes Non-Contact Coupling Half B 12 that forms a connection to Non-Contact Coupling Half A 11, an orientation target Orientation Target 8, and one or more Workpiece Holders 16. The connection between Non-Contact Coupling Half B 12 and Non-Contact Coupling Half A 11 is sufficiently rotationally rigid that the necessary power or torque needed to rotate one or more parts can be transmitted from the Rotational Drive 9 to the Workpiece Holders 16.

In embodiments that have more than one workpiece holder, Non-Contact Coupling Half B 12, Orientation Target 8, and Workpiece Holders 16 are all connected to Drive Train 14 which synchronizes their rotation. In an embodiment that has only one workpiece holder on the fixture, the half of the non-contact coupling on the fixture may directly connect the one workpiece holder to the other half of the non-contact coupling on Fixture Base 3. The Workpiece Holders 16 each support a proximal end of a part to be subjected to processing.

In one embodiment the drive train may rotate more than one part. In one embodiment a Tailstock Assembly 21 may be provided to support a distal end of the part to be subjected to a manufacturing process.

In one embodiment the Tailstock Assembly 21 is installed on a Guide Rail 18 to allow for parts of varying length.

In a situation where a part is cylindrically symmetric, the Orientation Sensor 7 and the Orientation Target 8 may be dispensed with, or may be allowed to be inoperative.

Figure 4:
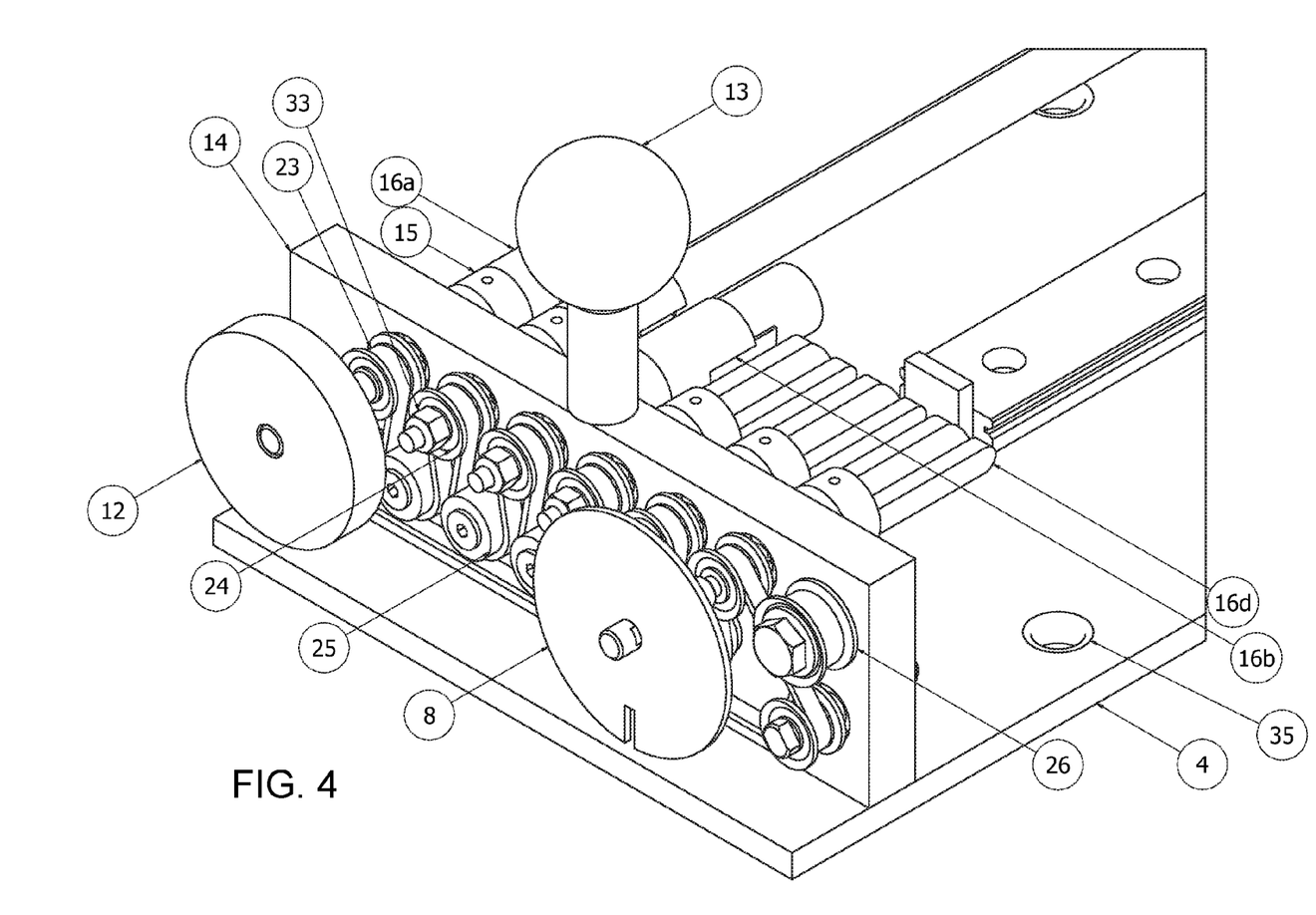
FIG. 4 is a perspective close up view of a portion of the apparatus showing the Fixture Drive Assembly that illustrates details of the part holder rotational elements according to principles of the invention.

FIG. 4 shows the details of one embodiment of a Drive Train 14. The Drive Train 14 conveys the rotation from Non-Contact Coupling Half B 12 to all of the Rotational Shafts 15 and Orientation Target 8. The motion is carried by a Timing Belt 23 to Pulleys 24 which rotates the Rotational Shafts 15. A Tensioner 26 is provided to adjust the Timing Belt 23 as it makes its way around Pulleys 24 and Idlers 25. Phasing of the individual Rotational Shafts 15 can be adjusted by changing the location of the Idlers 25 or Rotational Shafts 15 relative to Pulleys 24 and tightening Nuts 33.

Figure 5:
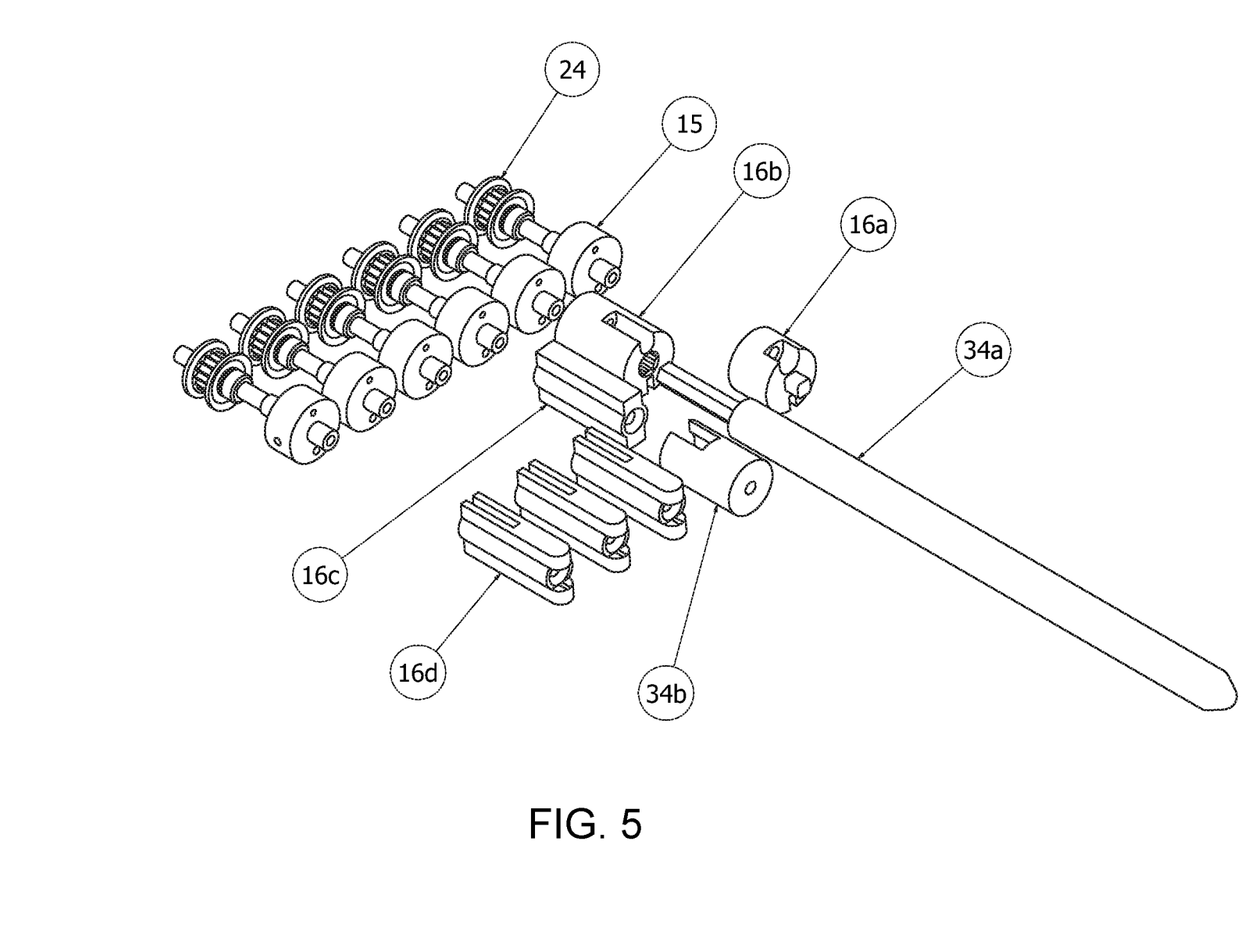
FIG. 5 is an exploded view of the Fixture Drive Assembly that illustrates the details of the part holder rotational elements according to the principles of the design.

FIG. 5 shows an embodiment of several different combinations of Rotational Shafts 15, Workpiece Holders 16, and Parts 34.

Several embodiments of Workpiece Holders 16 are shown as 16a, 16b, 16c, 16d. The Workpiece Holders 16 are keyed to set their angle relative to the Rotational Shafts 15.

In one embodiment, the workpiece holder is fastened to the Rotational Shafts 15 in the center.

In another embodiment, the workpiece holder is fastened to the Rotational Shafts 15 off of center.

In an additional embodiment, the Parts 34 can be placed tangentially to two Workpiece Holders 16 so that the rotation of the combination of Workpiece Holders 16 rotates the part.

Figure 6:
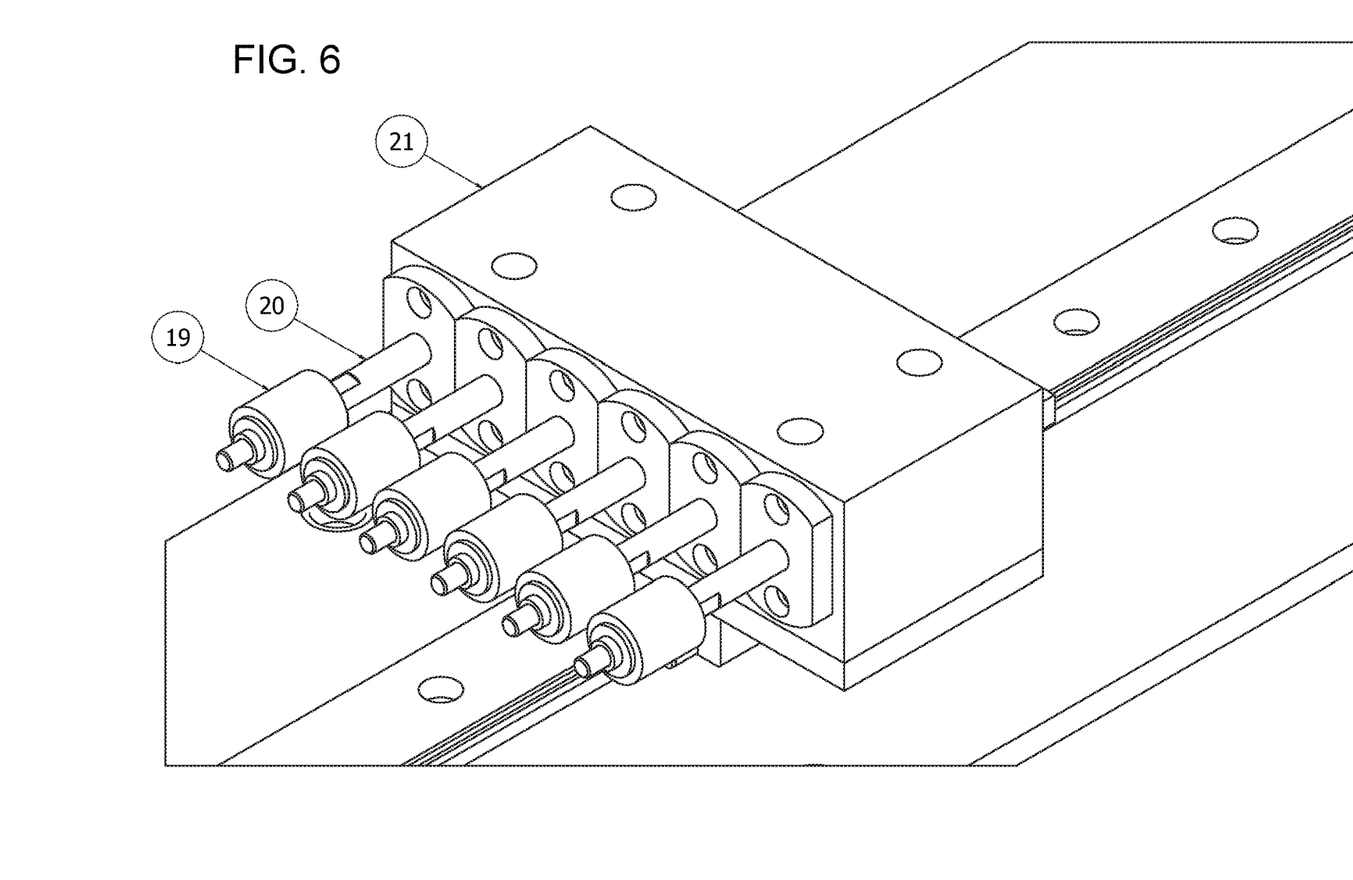
FIG. 6 is a perspective close up view of a portion of the apparatus showing the Fixture Tailstock Assembly that illustrates embodiment of part holder support elements according to principles of the invention.

For longer parts, an optional Tailstock Assembly 21 can be used.

FIG. 6 shows the components that can make up said assembly. A Tailstock Part Receiver 19 is installed on the end of a compliant Live Center 20.

Reverting to FIG. 1, initially the Fixture 4 is installed using Handles 13 on Fixture Base 3. The location is determined by the Locating Pins 5 of the Fixture Base 3. The Rotational Drive 9 rotates Non-Contact Coupling Half A 11 causing Non-Contact Coupling Half B 12 on the Fixture 4 to rotate. The drive train Drive Train 14 is rotated until Orientation Target 8 is detected by the Orientation Sensor 7. This is called homing and sets the zero location of the fixture. Knowing the relationship between the Orientation Target 8 and the Workpiece Holders 16 the Apparatus 102 can use the Rotational Drive 9 to rotate the part to the desired angle.

Performing a homing operation after changing to a different Fixture 4, a previously known angular relationship can used to rotate parts to stored angles.

In one embodiment, the Fixture 4 is identified by a visual, barcode, RFID, or other means of identification. This identification is used by the processor to recall the angular and positional relationships of the Fixture 4.

Figure 7:
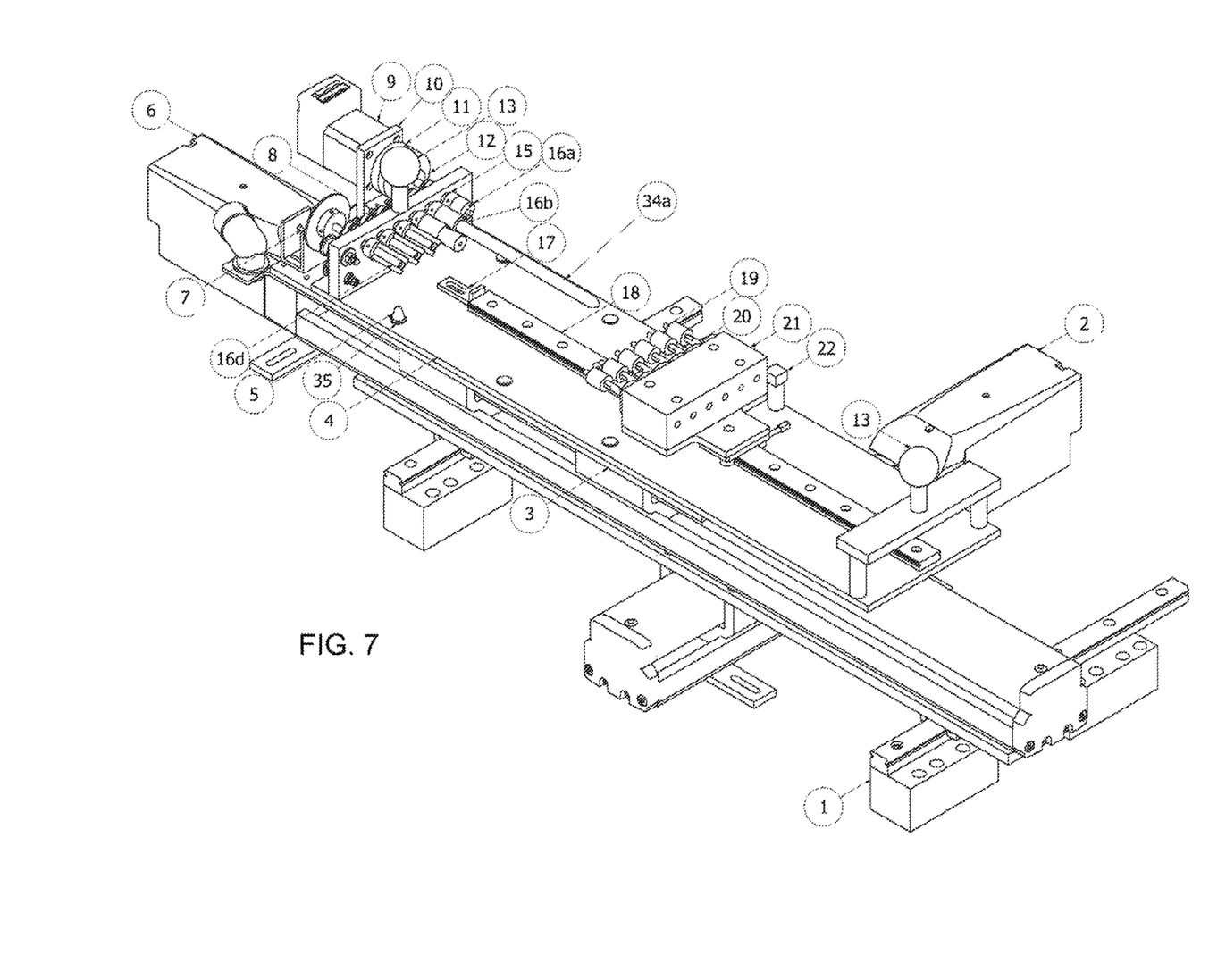
FIG. 7 is a perspective view of the apparatus showing the Part Holding Assembly with Rotation and Linear Translation that illustrates both rotational and linear elements according to principles of the invention.

FIG. 7 shows the part orienter installed on an X-Y gantry system. The X-Y gantry consists of an X-Axis Actuator 2, Y-Axis Actuator 6, and Support Rails 1. This embodiment of the Apparatus 102 can be used for processing multiple parts and includes a Calibration Target 22 to simplify location of the Fixture 4.

Figure 8:
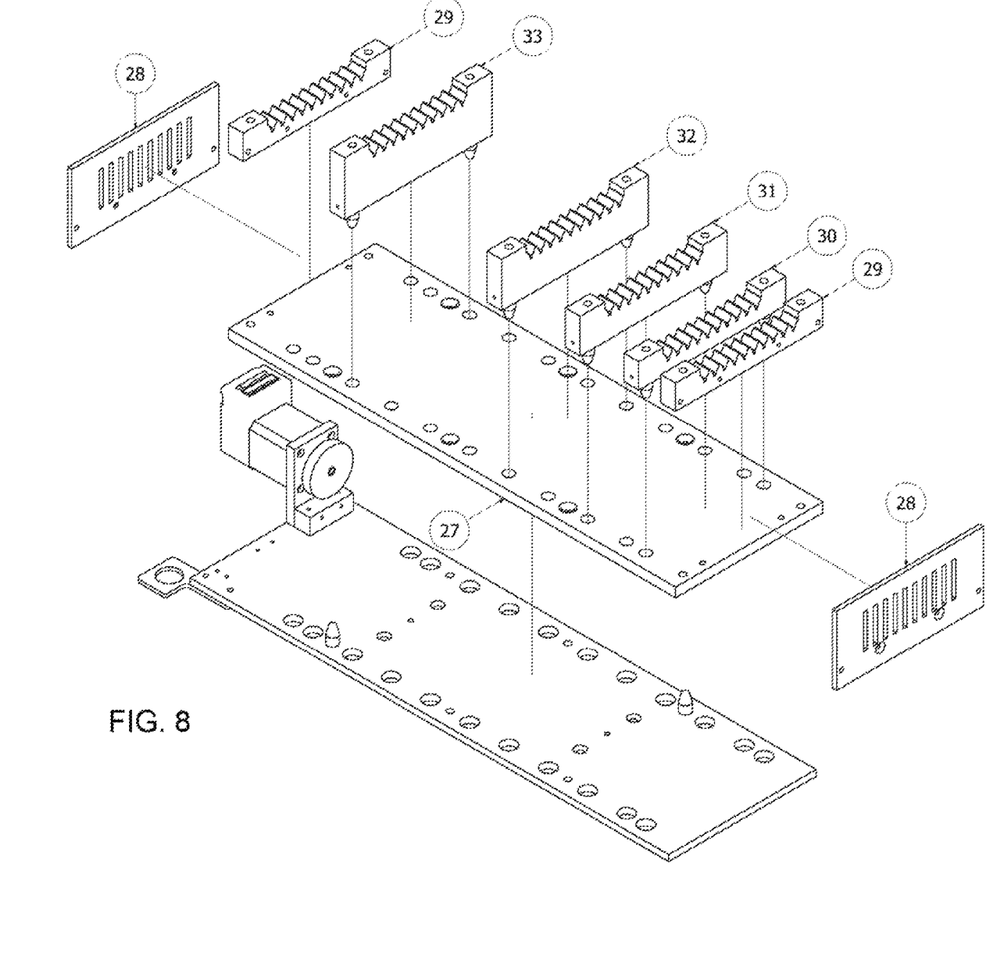
FIG. 8 is a perspective view of a Non-Rotating Fixture Assembly that illustrates details of the invention.

FIG. 8 shows an exploded view of a removable fixture without a rotational drive train consisting of a Non-Rotating fixture base 27, Fixture Endplates 28, and Part Support 29-32.

In one embodiment, said fixture can be substituted for the rotational Fixture 4.

Figure 9:
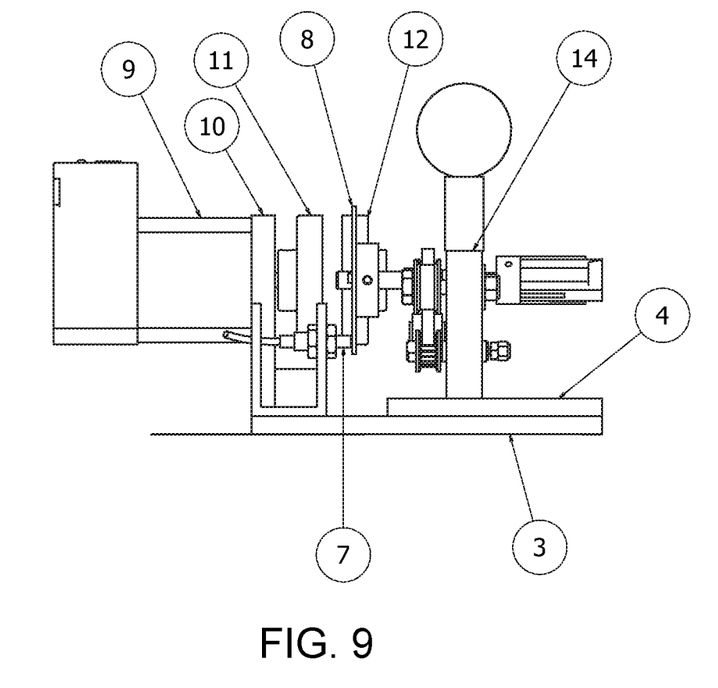
FIG. 9 is a close up view of a portion of the apparatus showing an embodiment of the Non-Contact Couplings, the Orientation Sensor, and Orientation Sensor Target.

FIG. 9 shows a close-up view of the Rotational Drive 9 fixed in position by Rotational Drive Support 10 attached to Fixture Base 3, connected to non-contact coupling Non-Contact Coupling Half A 11 which is rotationally connected to coupling Non-Contact Coupling Half B 12, but physically separated.

In the preferred embodiment, couplings Non-Contact Coupling Half A 11 and Non-Contact Coupling Half B 12 are magnetic; in other embodiments the couplings can be any non-contact coupling.

Additionally, in the preferred embodiment an optical sensor Orientation Sensor 7 is rigidly fixed to Fixture Base 3 and physically separated from rotational target Orientation Target 8.

In other embodiments any non-contact sensor and target can be used.

In an additional embodiment, Rotational Drive 9 can contain a controller which connects to Orientation Sensor 7. This is useful in that it does not require Controller 101 (FIG. 10) for rotational orientation.

Figure 10:
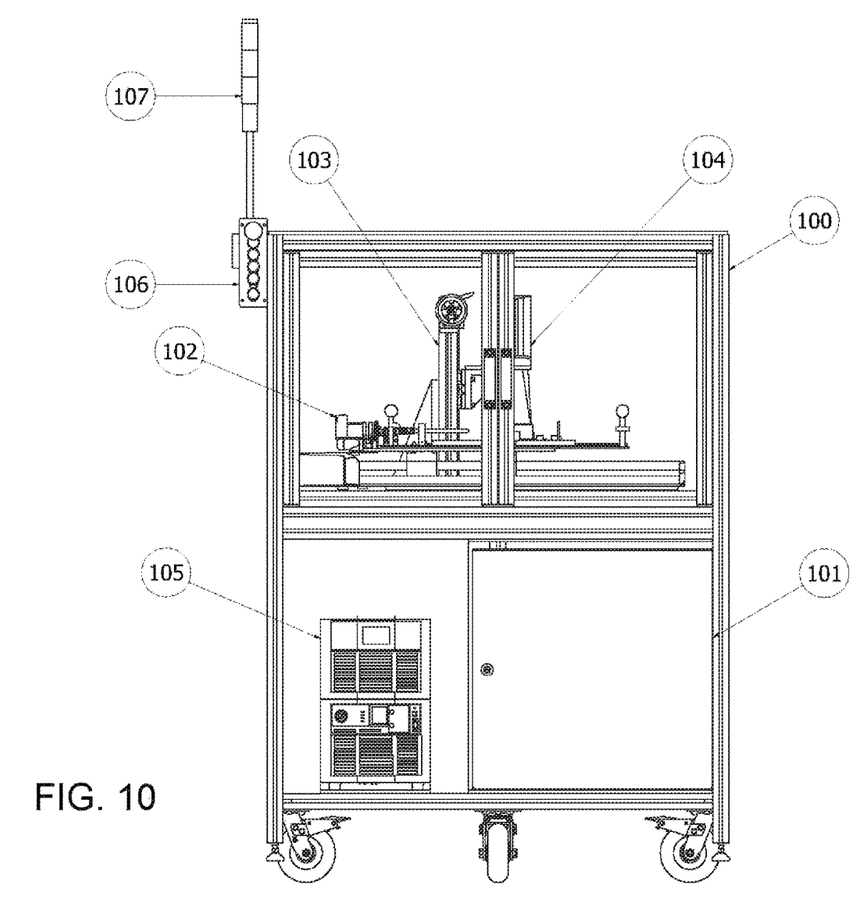
FIG. 10 is a front view of a machine utilizing the apparatus with a tool in an enclosure that illustrates details of the invention.

Additionally, Rotational Drive 9 can contain a controller which supplants any functionality of Controller 101 or Tool Controller 105.

FIG. 10 shows a view of a machine which comprises the Apparatus 102, a Processing Tool 104, a Tool Position Adjuster 103, Controller 101, a Tool Controller 105, an Operator Station 106, and a Status Indicator 107. The details of Apparatus 102 are shown in FIG. 7. The Processing Tool 104 is attached to a Tool Position Adjuster 103 locating the Processing Tool 104 appropriately to Parts 34. The Enclosure 100 supports and surrounds the Processing Tool 104, Tool Position Adjuster 103, Apparatus 102, and Parts 34. The Enclosure 100 may also support the Tool Controller 105 which is connected to the Processing Tool 104; the Controller 101; the Operator Station 106; and the Status Indicator 107.

In one embodiment, the Controller 101 is connected to Tool Controller 105, Rotational Drive 9, and Orientation Sensor 7. Controller 101 manipulates the Processing Tool 104 using Tool Controller 105. Controller 101 manipulates the Parts 34 based on the positional information from Orientation Sensor 7 and Orientation Target 8 through Rotational Drive 9 via Non-Contact Coupling Half A 11 and Non-Contact Coupling Half B 12 through Drive Train 14 by Rotational Shafts 15 and Workpiece Holders 16.

In an alternate embodiment, the Controller 101 is connected to Tool Controller 105, and Rotational Drive 9. Rotational Drive 9 is connected to Orientation Sensor 7 and utilizes Orientation Target 8 to manipulate Parts 34.

In another embodiment, Controller 101 is connected to an Operator Station 106.

In the preferred embodiment Operator Station 106 consists of lights and pushbuttons, in other embodiments the interface can consist of any human machine interface.

In another embodiment, Controller 101 is connected to a Status Indicator 107.

In the preferred embodiment the status indicator is a light stack. In other embodiments the status indicator can be any device for transmitting the status of the machine to any other device or human.

In another embodiment, Controller 101 is connected to a reader which identifies the Fixture 4 installed in Fixture Base 3.

In one embodiment the Controller 101 utilizes data located locally, in an alternate embodiment said Controller 101 access data remotely.

In a preferred embodiment, remote data is provided by a database.

Definitions

Any reference in the claims to an electronic signal or an electromagnetic signal (or their equivalents) is to be understood that in a preferred embodiment the signal is a non-transitory electronic signal or a non-transitory electromagnetic signal. If the signal per se is not claimed, the reference may in some instances be to a description of a propagating or transitory electronic signal or electromagnetic signal.

Unless otherwise explicitly recited herein, any reference to "record" or "recording" is understood to refer to a non-volatile or non-transitory record or a non-volatile or non-transitory recording.

Recording the results from an operation or data acquisition, for example, recording results such as an electrical signal having a particular frequency or wavelength, or recording an image or a portion thereof, is understood to mean and is defined herein as writing output data in a non-volatile or non-transitory manner to a storage element, to a machine-readable storage medium, or to a storage device. Non-volatile or non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, programmable logic controller ("PLC"), and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A machine for orienting parts, comprising:
a fixture base having one or more motors, an electrical power input port and a connector for connection to a general purpose programmable computer;
a removable part holding and aligning fixture configured to be mated to said fixture base in a predetermined location and orientation relative to each other, said removable part holding and aligning fixture having at least one workpiece holder configured to hold a part and to align said part so that a manufacturing process can be applied to a specific location on said part; said base and said removable part holding and aligning fixture each comprising one half of a non-contact coupling, said non-contact coupling configured to provide a connection sufficiently rigid that the necessary power or torque needed to rotate one or more parts can be transmitted from one of said one or more motors to said at least one workpiece holder.

2. The machine for orienting parts of claim 1, wherein said removable part holding and aligning fixture comprises one or more handles configured to assist in mating said removable part holding and aligning fixture with said fixture base or to assist in removing it therefrom.

3. The machine for orienting parts of claim 1, wherein said fixture base comprises at least one aligning pin and said removable part holding and aligning fixture comprises at least one mating orifice defined therein.

4. The machine for orienting parts of claim 1, wherein one of said one or more motors is a rotational drive.

5. The machine for orienting parts of claim 1, wherein said one of said one or more motors is a translational drive.

6. The machine for orienting parts of claim 1, wherein said removable part holding and aligning fixture comprises a plurality of workpiece holders commonly driven by a synchronous drive.

7. The machine for orienting parts of claim 1, wherein said fixture base further comprises an orientation sensor and said removable part holding and aligning fixture further comprises an orientation target.

8. The machine for orienting parts of claim 1, where multiple fixtures of differing arrangements can be installed.

9. The machine of claim 8 where one or more fixtures do not rotate.

10. The machine of claim 1 where the workpiece holders are removable.

11. The machine for orienting and processing parts of claim 7, further comprising a general purpose programmable computer operating under a set of instructions recorded on a machine readable medium, said general purpose programmable computer configured by said instructions to sense an orientation based on data received from said orientation target.

12. The machine for processing parts of claim 11, wherein the removable fixture has a unique means of identifying it by which said general purpose programmable computer can recall information about the fixture.

13. The machine for processing parts of claim 11, wherein the removable fixture has a reference feature by which said general purpose programmable computer can align said tool.

14. The machine for processing parts of claim 1, further comprising a tool configured to perform a process step on a part held in one of said at least one workpiece holder.

15. The machine for processing parts of claim 9, wherein said tool is a laser.

16. The machine for processing parts of claim 9, wherein said tool is a robot.

17. The machine for processing parts of claim 9, wherein said tool is an engraver.

18. The machine for processing parts of claim 9, wherein said tool is a welder.

19. The machine of claim 14, where the tool requires an enclosure.

20. The machine of claim 11, where the general purpose programmable computer is an integral part of the rotational drive.

21. The machine of claim 6, where two rotating workpiece holders support the part and impart rotation to said part.

22. The machine for orienting parts of claim 1, wherein said removable part holding and aligning fixture comprises at least one aligning pin and said fixture base comprises at least one mating orifice defined therein.

* * * * *